United States Patent
Schick

(10) Patent No.: US 10,166,814 B2
(45) Date of Patent: Jan. 1, 2019

(54) AXLE WHEEL END AXIAL THRUST ASSEMBLY

(71) Applicant: Koyo Bearings North America LLC, Westlake, OH (US)

(72) Inventor: Gary Schick, Easley, SC (US)

(73) Assignee: KOYO BEARINGS NORTH AMERICA LLC, Westlake, OH (US)

( * ) Notice: Subject to any disclaimer, the term of this patent is extended or adjusted under 35 U.S.C. 154(b) by 0 days.

(21) Appl. No.: 15/510,649

(22) PCT Filed: Sep. 11, 2015

(86) PCT No.: PCT/US2015/049766
§ 371 (c)(1),
(2) Date: Mar. 10, 2017

(87) PCT Pub. No.: WO2016/040854
PCT Pub. Date: Mar. 17, 2016

(65) Prior Publication Data
US 2017/0190216 A1   Jul. 6, 2017

Related U.S. Application Data

(60) Provisional application No. 62/049,229, filed on Sep. 11, 2014, provisional application No. 62/049,244, filed on Sep. 11, 2014.

(51) Int. Cl.
*B60B 35/18* (2006.01)
*B60B 35/14* (2006.01)
(Continued)

(52) U.S. Cl.
CPC .............. *B60B 35/18* (2013.01); *B60B 35/122* (2013.01); *B60B 35/14* (2013.01); *B60B 35/16* (2013.01);
(Continued)

(58) Field of Classification Search
CPC ......... B60B 35/18; B60B 35/14; B60B 35/16; B60B 35/122; B60B 2380/14;
(Continued)

(56) References Cited

U.S. PATENT DOCUMENTS 1,619,702 A    3/1927  Chorlton
1,673,932 A    6/1928  Baxter
(Continued)

FOREIGN PATENT DOCUMENTS

WO    2008/110938 A2     9/2008
WO    2014/074507 A1     5/2014
WO    WO 2014074507 A1 *  5/2014  ............ F16C 35/063

OTHER PUBLICATIONS

International Search Report and Written Opinion dated Dec. 8, 2015 for PCT/US2015/049766.

*Primary Examiner* — S. Joseph Morano
*Assistant Examiner* — Jean W Charleston
(74) *Attorney, Agent, or Firm* — Nelson Mullins Riley & Scarborough LLP

(57) ABSTRACT

An axle assembly for a vehicle including a differential assembly, a first axle tube extending outwardly from the differential assembly and including an axle bore, a first axle shaft rotatably received in the axle bore of first axle tube and including a first annular groove, an annular ring holder disposed within the axle bore of the first axle tube, a radial bearing assembly including an outer race and a plurality of roller elements being axially fixed within the axle bore of the first axle tube, a first snap ring received in the annular groove of the first axle shaft, and a thrust ring, the thrust ring being axially disposed between the radial bearing assembly and the first snap ring so that the thrust ring bears against the plurality of roller elements.

21 Claims, 10 Drawing Sheets

(51) Int. Cl.
*B60B 35/16* (2006.01)
*F16C 35/04* (2006.01)
*F16C 35/077* (2006.01)
*F16C 19/26* (2006.01)
*F16C 33/58* (2006.01)
*B60B 35/12* (2006.01)
*B60K 17/16* (2006.01)

(52) U.S. Cl.
CPC ............ *B60K 17/165* (2013.01); *F16C 19/26* (2013.01); *F16C 33/581* (2013.01); *F16C 35/045* (2013.01); *F16C 35/077* (2013.01); *B60B 2380/14* (2013.01); *B60B 2380/71* (2013.01); *F16C 2326/20* (2013.01)

(58) Field of Classification Search
CPC ...... F16C 19/26; F16C 35/045; F16C 33/581; F16C 2326/20; B60K 17/165
USPC .............................. 301/124.1, 131, 132, 137
See application file for complete search history.

(56) References Cited

U.S. PATENT DOCUMENTS

| | | |
|---|---|---|
| 1,919,248 A | 7/1933 | Murphy |
| 2,634,178 A | 4/1953 | Chievitz |
| 2,743,142 A | 4/1956 | Balsiger |
| 2,839,343 A | 6/1958 | Emil |
| 3,148,897 A | 9/1964 | Hurt et al. |
| 3,690,399 A * | 9/1972 | Bokovoy ............... B60K 17/16 180/379 |
| 4,205,866 A | 6/1980 | McCracken |
| 4,478,435 A | 10/1984 | Cheshier et al. |
| 4,478,438 A | 10/1984 | Elorriaga, Jr. |
| 7,128,168 B2 | 10/2006 | Youan |
| 9,593,757 B2 | 3/2017 | Downs et al. |
| 2006/0103232 A1* | 5/2006 | Beutler ................... B03C 1/286 301/137 |
| 2014/0339888 A1* | 11/2014 | Downs ................... B60B 35/18 301/137 |

\* cited by examiner

AXLE WHEEL END AXIAL THRUST ASSEMBLY

FIELD OF THE INVENTION

The present disclosure relates generally to solid axle assemblies for vehicles and, more specifically, to bearing assemblies that are utilized on the wheel end sections of such solid axle assemblies.

BACKGROUND

Salisbury solid axles are often used in passenger trucks and sport utility vehicles. Salisbury axles are unique in the fact that the axle transmits driving torque to the wheel as well as carries and transmits both radial and axial thrust loads.

As shown in FIG. 1, many existing wheel end bearings 10 for use with solid vehicle axles include an outer cup 11 that is press-fit into the corresponding axle tube 12 to maintain location and define an outer raceway for the corresponding rollers 13. No additional retention features are required for this type of wheel end bearing 10 in that the bearing only handles radial loads. Lubrication for wheel end bearing 10 is provided by the same oil sump that provides lubrication to the differential gears 15 (FIG. 2) that are disposed at the center section of the axle assembly. To maintain lubrication, an oil seal 14 is press-fitted outboard of the wheel end bearing in axle tube 12.

Radial wheel end loads are handled primarily at wheel end bearing 10, whereas axial loads are not. Rather, as best seen in FIGS. 2 through 4, axial loads are transmitted along axle shaft 16. Typically, "C Locks" 18 are utilized to resist outward axial loading and a cross shaft 20 disposed between the opposing axles in a housing 25 of differential 17 absorbs inward axial loading. A typical C Lock includes a heavy annular lock ring 19 received in an annular groove 21 formed on the inboard end of a corresponding axle shaft 16. In the fully assembled configuration (FIG. 3), annular lock ring 19 is further received in an annular recess 23 formed in an end face of a corresponding differential gear 15. During normal operations, inward axial loading has a higher magnitude than outward axial loading due to vehicle dynamics during cornering. When outward axial load on axle shaft 16 occurs, axle shaft 16 attempts to move outwardly from axle tube 12, which causes annular lock ring 19 of the corresponding C Lock 18 to push on the corresponding differential side gear 15. Ultimately, the outward axial load is dispersed through differential carrier bearings 24 to housing 25 of the differential, as shown in FIG. 4.

When inward axial loading is generated from vehicle cornering, an end face 27 of axle shaft 16 thrusts against differential cross shaft 20, as best seen in FIG. 2. In turn, the inward axial loading is transmitted through differential carrier bearings 24, as shown in FIG. 4.

The present invention recognizes and addresses considerations of prior art constructions and methods.

SUMMARY

One embodiment of an axle assembly of a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, an opposite distal end extending outwardly from the distal end of the first axle shaft, and a first annular groove extending radially inwardly from its outer surface, an annular ring holder axially fixed within the axle bore of the first axle tube, a radial bearing assembly including an outer race and a plurality of roller elements rotatably received therein, the radial bearing assembly being disposed within the axle bore of the first axle tube, a first snap ring received in the annular groove of the first axle shaft, and a thrust ring, the thrust ring being disposed within the axle bore of the first axle tube between the radial bearing assembly and the first snap ring so that the thrust ring abuts the radial bearing assembly.

Another embodiment of an axle assembly of a vehicle includes a differential assembly, a first axle tube extending outwardly from a first side of the differential assembly, the first axle tube including a proximal end adjacent the differential assembly, an opposite distal end, and an axle bore extending therebetween, a first axle shaft rotatably received in the first axle tube, the first axle shaft including a proximal end disposed in the differential assembly, an opposite distal end extending outwardly from the distal end of the first axle shaft, and a first annular groove extending radially inwardly from its outer surface, a radial bearing assembly including an outer race and a plurality of roller elements rotatably received therein, the radial bearing assembly being disposed within the axle bore of the first axle tube, and a first snap ring received in the annular groove of the first axle shaft, wherein the first snap ring transmits axially directed force from the first axle shaft to the radial bearing assembly.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
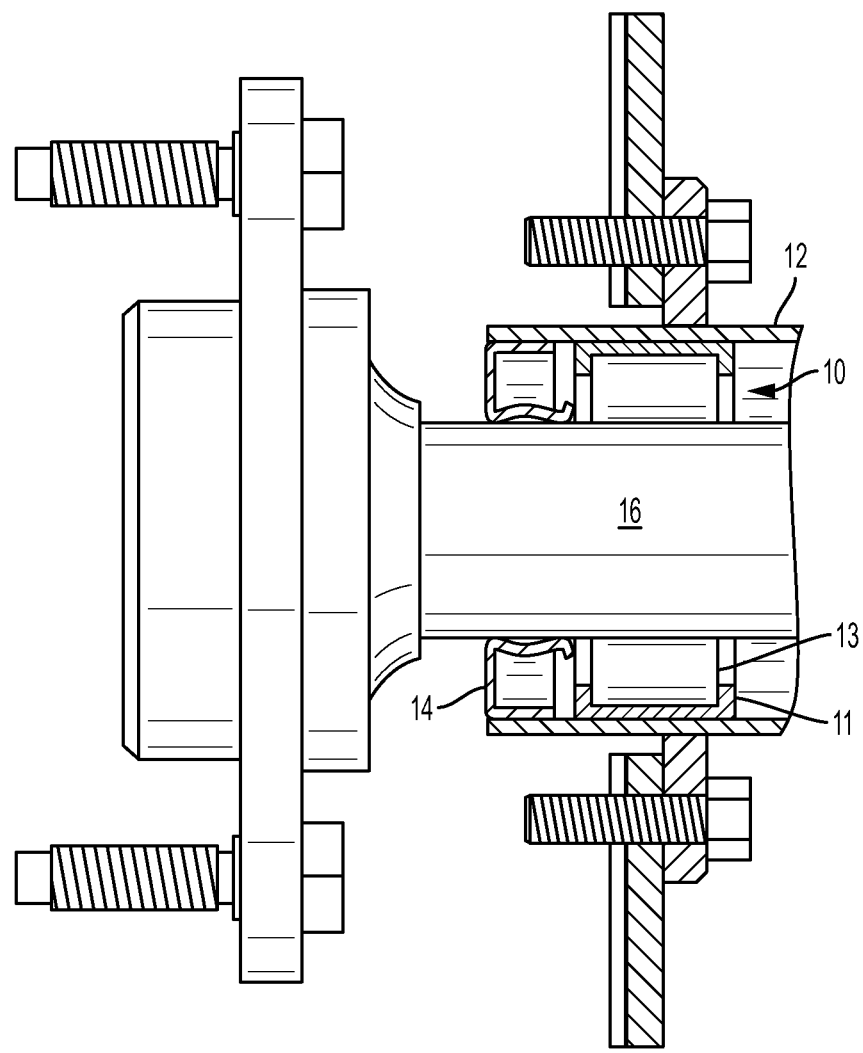
FIG. 1 is a partial cross-sectional view of a wheel end section of a prior art solid axle assembly.
Figure 2:
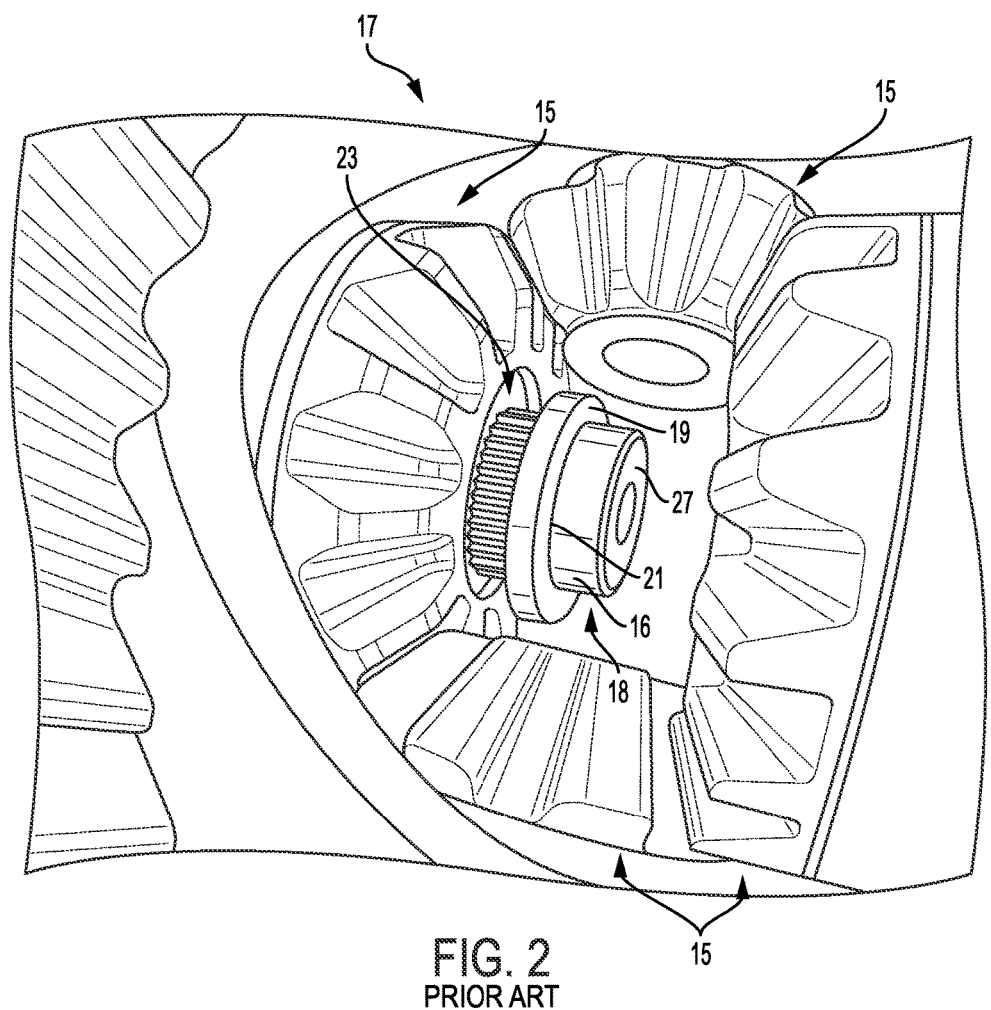
FIG. 2 is a partial perspective view of the prior art axle shaft shown in FIG. 1 and a corresponding differential.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 5:
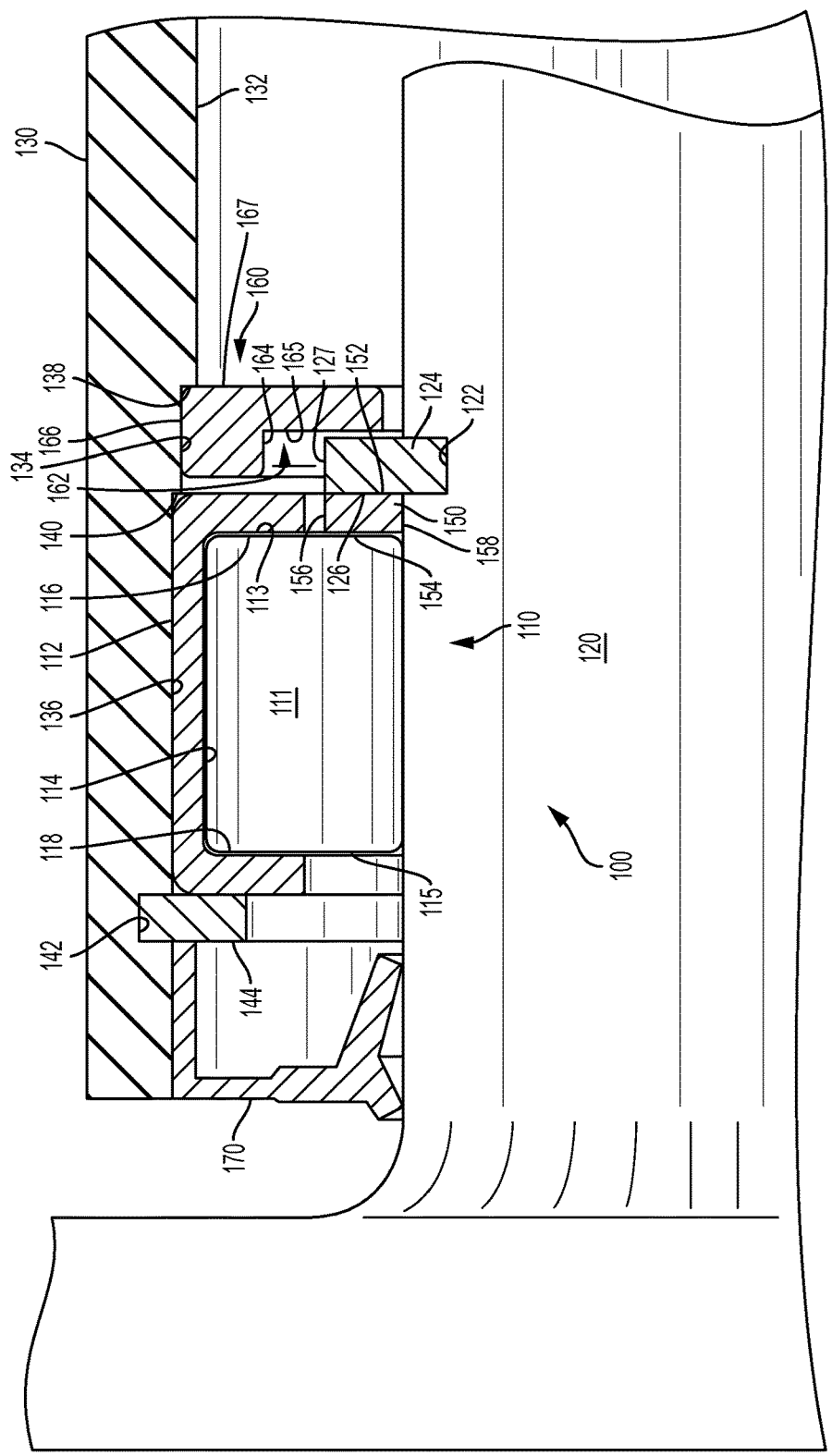
FIG. 5 is a partial cross-sectional view of a wheel end section of a solid axle assembly including an axial thrust assembly in accordance with an embodiment of the present invention.
Figure 6:
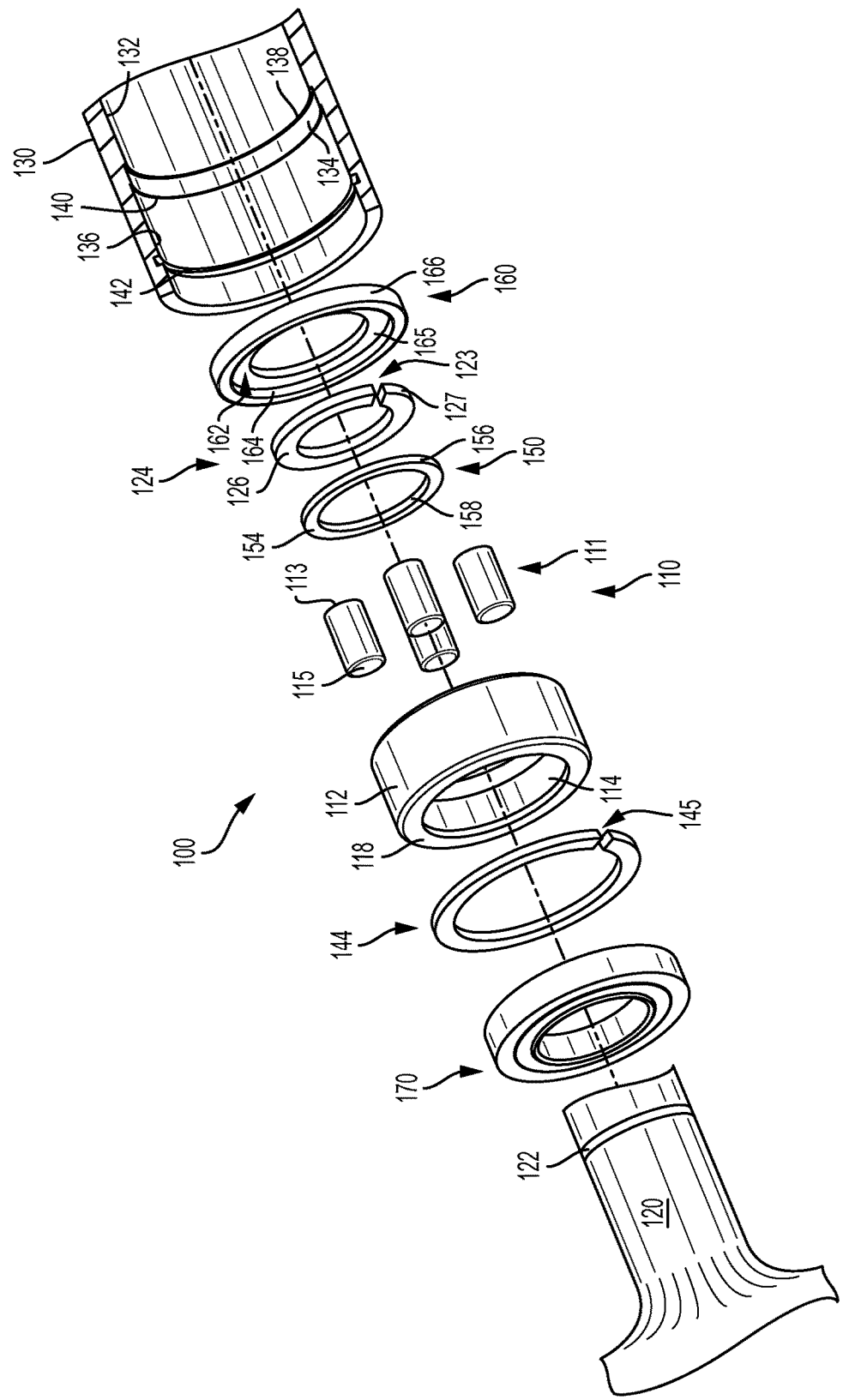
FIG. 6 is an exploded perspective view of the axial thrust assembly shown in FIG. 5.

Referring now to FIGS. 5 and 6, a wheel end axial thrust assembly 100 for use with a solid vehicle axle in accordance with an embodiment of the present disclosure includes a thrust component including a snap ring holder 160, a radial bearing assembly 110, a first snap ring 124 and a thrust ring 150 disposed therebetween, and a second snap ring 144 received in an annular groove 142 of the corresponding axle tube 130, outboard of radial bearing assembly 110. Axial thrust assembly 100 is disposed in the wheel end of axle tube 130 about the wheel end of a corresponding axle shaft 120, as discussed in greater detail below.

Snap ring holder 160 of the axial thrust component is annular in shape and includes a cylindrical outer surface 166 and a counterbore 162 formed by an axially extending annular wall 164 that extends inwardly from one of its end faces 167 to an annular face 165 thereof. Annular face 165 is transverse to a longitudinal center axis of axle tube 130. Counterbore 162 is configured to at least partially receive first snap ring 124 therein during assembly. Counterbore 162 has a greater diameter than first snap ring 124 so that first snap ring 124 is allowed to expand as it is slidably positioned over axle shaft 120 and into a corresponding annular groove 122 defined therein.

First snap ring 124 includes a pair of end faces 126 that are substantially parallel and transverse to the longitudinal center axis of axle shaft 120. One end face 126 is adjacent transverse face 165 of snap ring holder 160, whereas the other end face 126 is adjacent a first end face 152 of thrust ring 150. A split 123 in first snap ring 124 allows it to expand as it is slid axially over axle shaft 120 during installation. First end face 152 and a second end face 154 of thrust ring 150 are substantially parallel and extend from a cylindrical outer surface 156 of thrust ring 150 to its cylindrical inner surface 158. Cylindrical inner surface 158 of thrust ring 150 defines a bore having a greater diameter than axle shaft 120 so that thrust ring 150 is free to rotate thereabout. Preferably, thrust ring 150 is a hardened or ground steel washer, although other materials are possible.

Figure 3:
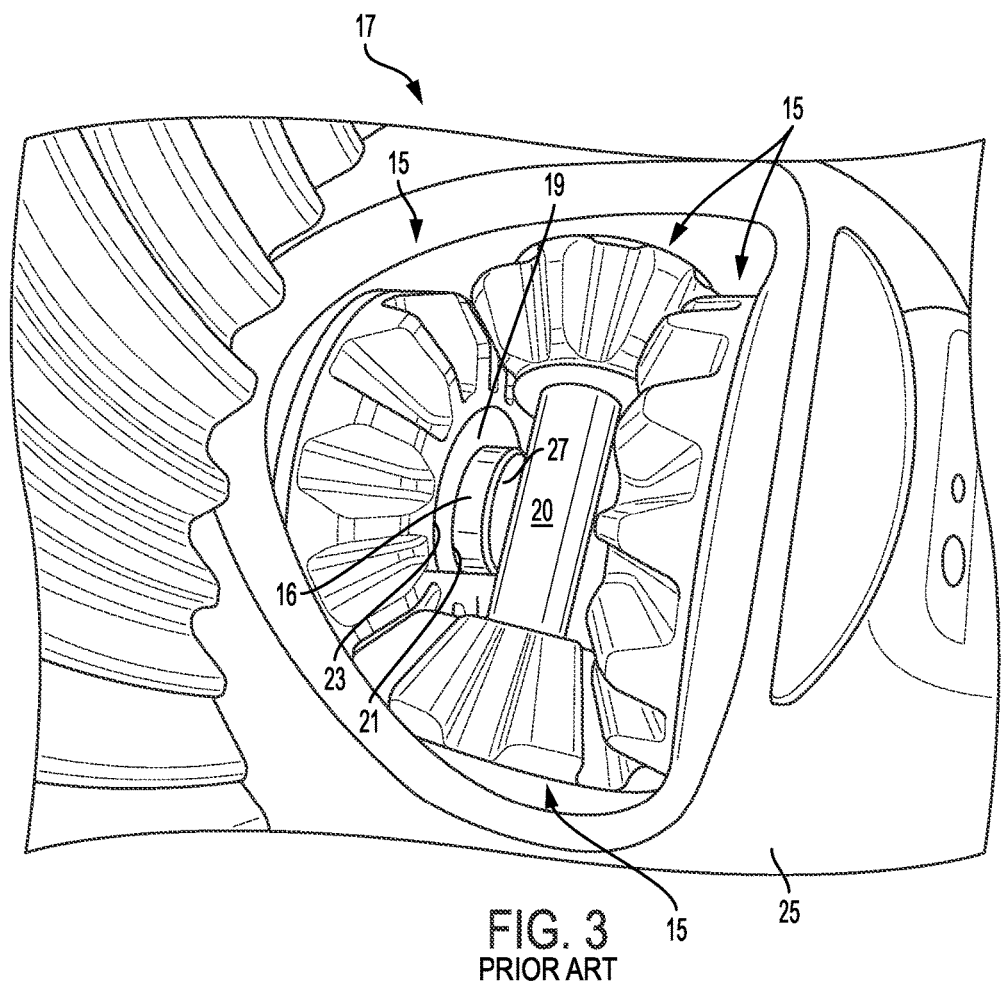
FIG. 3 is a partial perspective view of the prior art axle shaft and differential shown in FIG. 2, including a cross shaft of the differential.

As best seen in FIG. 5, snap ring holder 160 is preferably received in a first cylindrical recess 134 that is disposed between a second cylindrical recess 136 and a bore 132 of axle tube 130 in a light press-fit. First cylindrical recess 134 has a slightly greater diameter than does the remainder of the axle tube's bore 132 so that a first annular ledge 138 is defined at their juncture. First annular ledge 138 is transverse to the longitudinal center axis of axle tube 130 and configured to abut the inboard annular sidewall of snap ring holder 160. As such, first annular ledge 138 helps position snap ring holder 160 within axle tube 130 during installation and allows snap ring holder 160 to transfer inward axial thrust forces acting on axle shaft 120 to axle tube 130, if desired. Note, however, in alternative embodiments, snap ring holder 160 may simply be received in bore 132 of a corresponding axle tube 130 with further inward motion of axle shaft 120 being prevented by way of the corresponding differential cross shaft 20 (FIG. 3).

Figure 7:
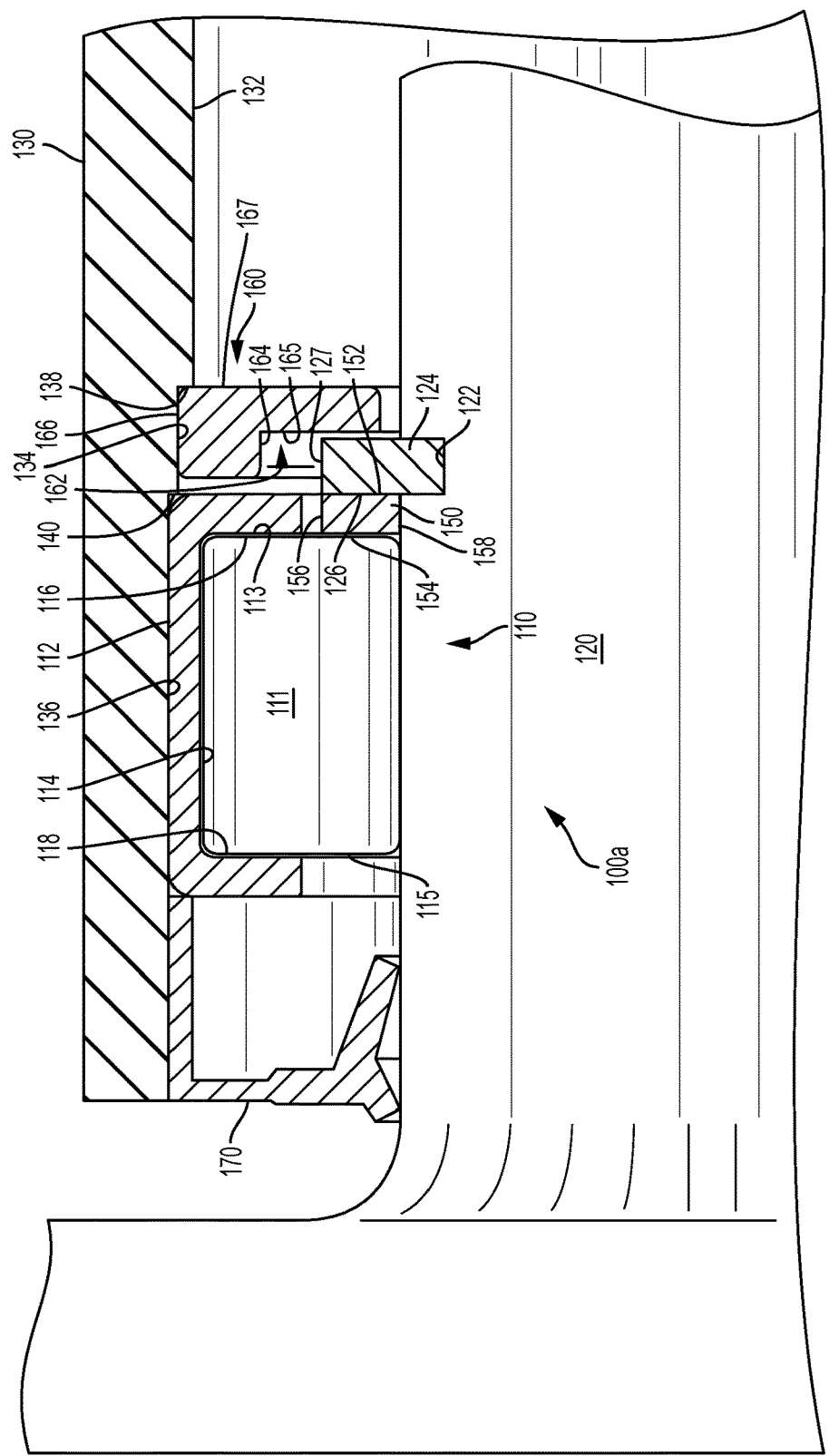
FIG. 7 is a partial cross-sectional view of a wheel end section of a solid axle assembly including an axial thrust assembly in accordance with an alternate embodiment of the present disclosure.

Outer cup 112 of radial bearing assembly 110 defines a cylindrical outer race 114 for needle rollers 111. A first annular flange 116 and second annular flange 118 extend radially-inwardly from opposite ends of outer race 114. Outer cup 112 is preferably a machined and ground component made from a carburized grade of steel to enhance control of the press-fit, bearing clearances, and increase allowable hoop stresses. As shown, outer cup 112 is preferably received in second cylindrical recess 136 of axle tube 130 in a press-fit, outboard of snap ring holder 160. Outer cup 112 is press-fit in second cylindrical recess 136 to assist in handling outward axial thrust forces. Second cylindrical recess 136 has a slightly greater diameter than does first cylindrical recess 134 so that a second annular ledge 140 is defined at their juncture. Second annular ledge 140 is transverse to the longitudinal center axis of axle tube 130 and is configured to abut first annular flange 116 of outer cup 112. As such, second annular ledge helps position outer cup 112 during installation. Note, as shown in FIG. 7, in an alternate embodiment of axial thrust assembly 100a, outward axial thrust forces are handled solely by the press-fit of outer cup 112 in axle tube 130. However, in the present embodiment, a second snap ring 144 is received in an annular groove 142 defined by the inside surface of axle tube 130 to handle outward axial thrust forces. A split 145 in snap ring 144 allows the ring to be compressed as it is slid inwardly into the bore of axle tube 130, expanding outwardly upon being seated in annular groove 142. An oil seal 170 is press-fit into axle tube 130 outboard of snap ring 144 to help maintain lubricating fluids therein.

Each needle roller 111 disposed in outer cup 112 includes a cylindrical rolling surface extending between a first end face 113 and a second end face 115. Each first and second end face 113 and 115 is transverse to a longitudinal center axis of the corresponding needle roller 111. As such, when needle rollers 111 are disposed between the outer surface of axle shaft 120 and outer cup 112, first end faces 113 and second end faces 115 are parallel to first annular flange 116 and second annular flange 118, respectively, of outer cup 112.

During vehicle operations, axial thrust forces that are directed outwardly along axle shaft 120 are transferred to thrust washer 150 by the abutment of first snap ring 124 on the thrust washer's first end face 152. The axial thrust force is then transferred from thrust washer 150 to needle rollers 111 by way of the abutment of second end face 154 of thrust washer 150 with first end faces 113 of the plurality of rollers 111. Subsequently, the outward axial thrust force is transferred to outer cup 112 by the abutment of second end faces 115 of the plurality of needle rollers 111 with second annular flange 118 of outer cup 112. Note, when the outward axial thrust force is low enough, the press-fit between outer cup 112 and axle tube 130 may be great enough to prevent outward motion of axle shaft 120. However, when the thrust force is great enough, outer cup 112 transfers the axial thrust force to snap ring 144. Second snap ring 144 ultimately transfers the axial thrust force to axle tube 130 by way of being seated in annular groove 142 thereof. As previously noted, in alternate embodiments, second snap ring 144 is not required where the press-fits between outer cup 112 and axle tube 130 exceeds maximum expected outward axial thrust forces on axle shaft 120. An annular thrust washer may be disposed between one or both of first end faces 113 of rollers 111 and first annular flange 116, and second end faces 115 of rollers 111 and second annular flange 118, to provide more uniform bearing surfaces during thrust force transfer. In an alternate embodiment, thrust washer 150 may be omitted so that first snap ring 124 bears directly on first end faces 113 of needle rollers 111.

Figure 4:
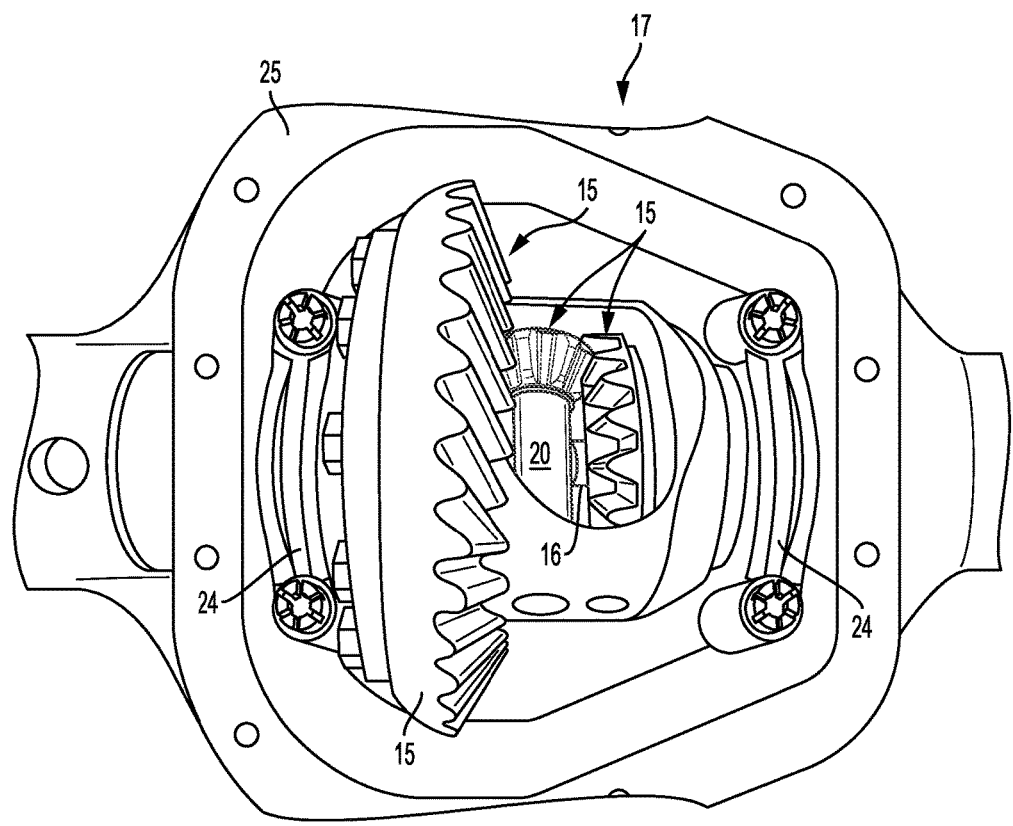
FIG. 4 is a cut away side view of the prior art axle shaft and differential shown in FIG. 2.

When axial thrust force caused by vehicle operations is directed inwardly, the axial thrust force transferred to snap ring holder 160 by first snap ring 124 may, in turn, be transferred from snap ring holder 160 to axle tube 130 by way of its abutment with first annular ledge 138. However, inward axial thrust forces acting on axle shaft 120 are preferably handled by abutment of the axle shaft's innermost end with a cross shaft 20 (FIGS. 3 and 4) of the axle's differential, in the manner previously discussed.

At assembly, snap ring holder 160, first snap ring 124 and thrust ring 150 are loaded into the bore of axle tube 130 prior to the insertion of radial bearing assembly 110, second snap ring 144, and oil seal 170. Preferably, snap ring holder 160 is formed from machined or powder metal steel, with no heat treatment being required, although other materials may be used. Counterbore 162 in snap ring holder 160 loosely pilots first snap ring 124 as axle shaft 130 is inserted into axle bore 132. A lead (not shown) on the end of axle shaft 120 centers first snap ring 124 and helps it start sliding over axle shaft 120. Snap ring holder 160 holds first snap ring 124 in the desired axial position within axle tube 130 as axle shaft 120 is inserted. Once fully assembled in axle tube 130, first snap ring 124 snaps into annular groove 122 of axle shaft 120. Counterbore 162 on snap ring holder 160 is large enough to allow first snap ring 124 to expand over axle shaft 120 before it is received into annular groove 122.

Figure 8:
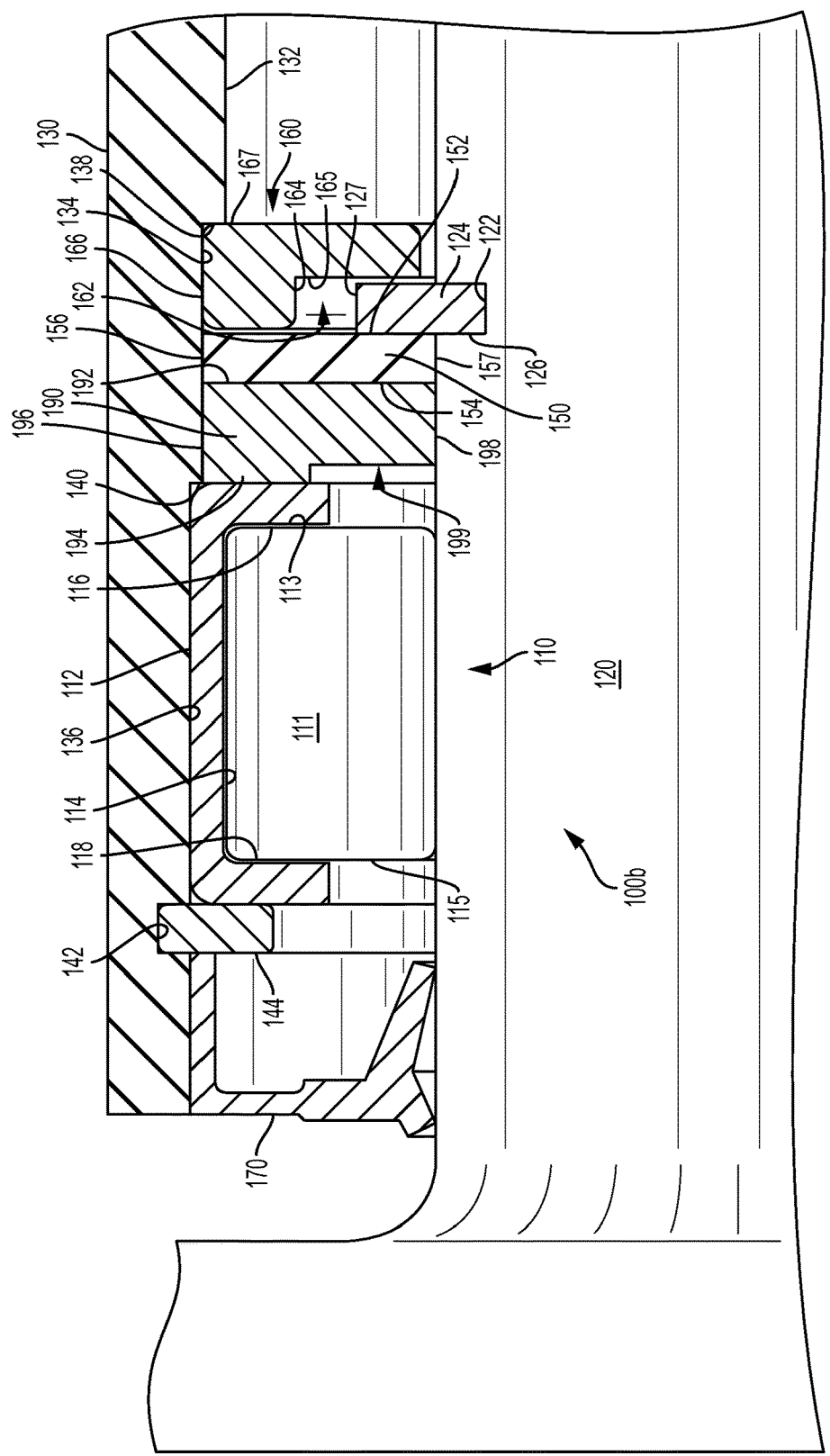
FIG. 8 is a partial cross-sectional view of a wheel end section of a solid axle assembly including an axial thrust assembly in accordance with an alternate embodiment of the present invention.
Figure 9:
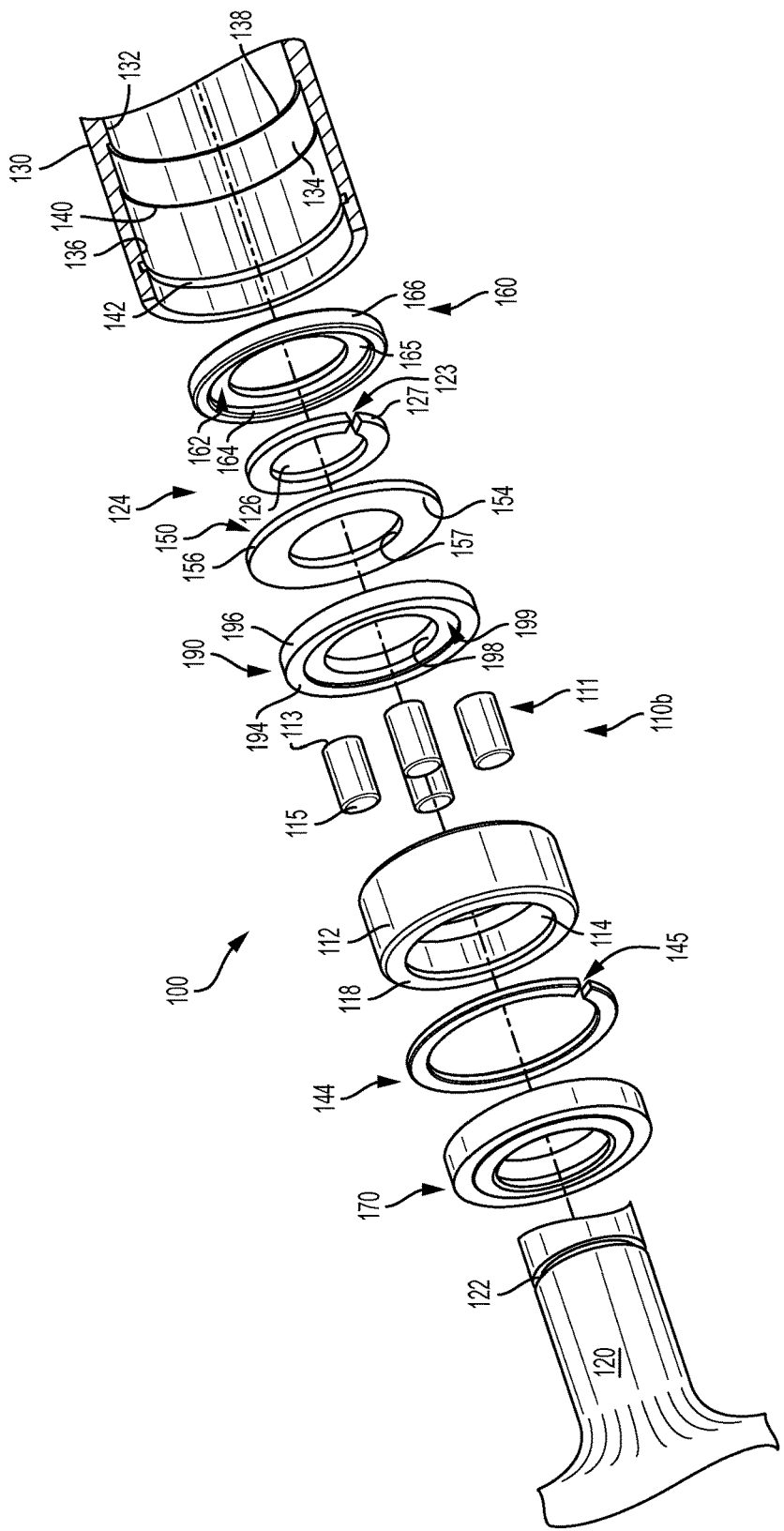
FIG. 9 is an exploded perspective view of the axial thrust assembly shown in FIG. 8.
Figure 10:
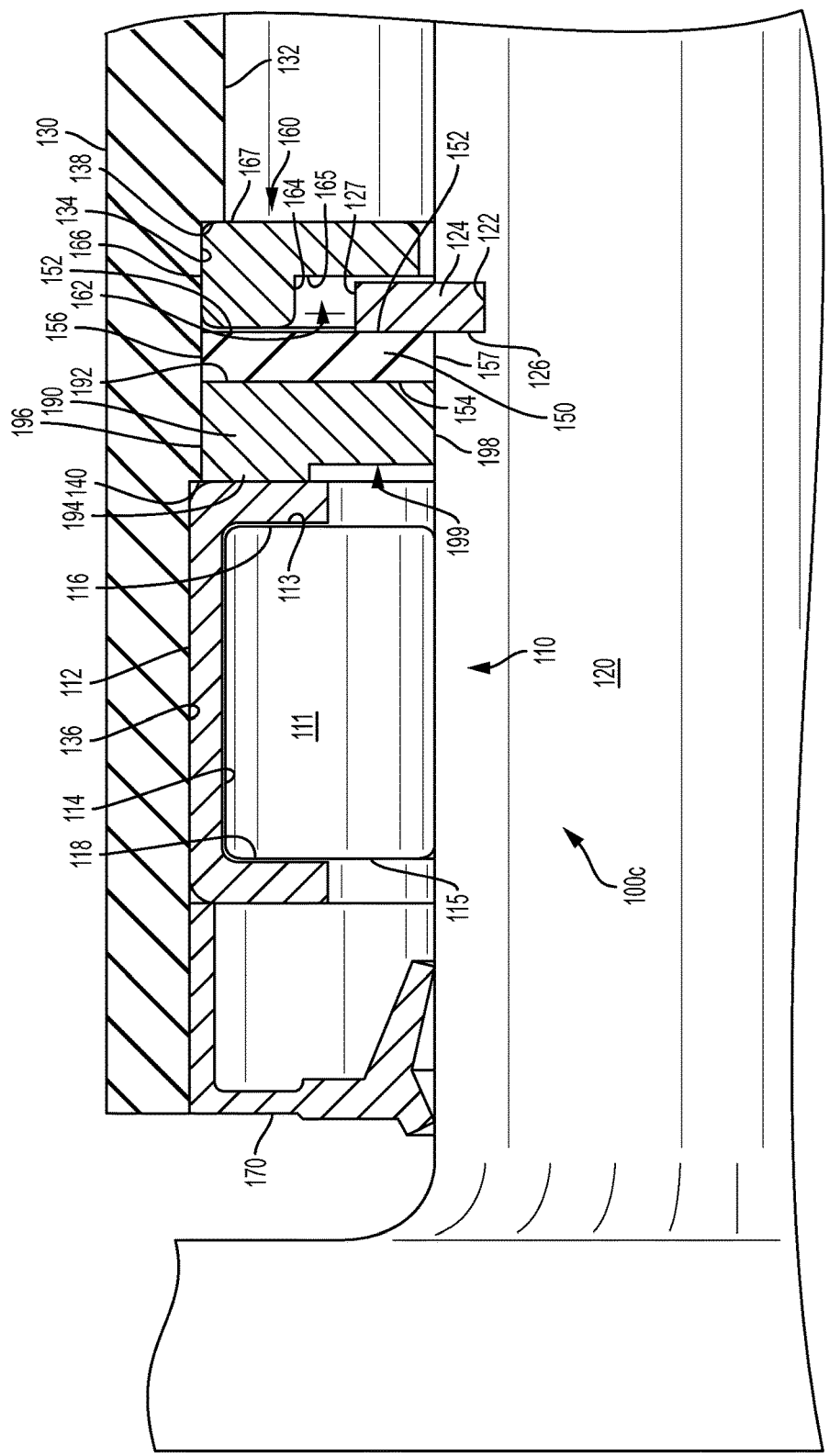
FIG. 10 is a partial cross-sectional view of a wheel end section of a solid axle assembly including an axial thrust assembly in accordance with an alternate embodiment of the present disclosure.

Referring now to FIGS. 8 and 9, a wheel end axial thrust assembly 100b for use with a solid vehicle axle in accordance with an alternate embodiment of the present disclosure includes a thrust component including a snap ring holder 160, a radial bearing assembly 110, a first snap ring 124 and a pair of thrust rings 150 and 190 disposed therebetween, and a second snap ring 144 received in an annular groove 142 of the corresponding axle tube 130, outboard of radial bearing assembly 110. Axial thrust assembly 100b is disposed in the wheel end of axle tube 130 about the wheel end of a corresponding axle shaft 120, as discussed in greater detail below.

The only components of axial thrust assembly 100b that differ from the embodiment shown in FIGS. 5 and 6 are first thrust ring 150 and second thrust ring 190. As such, only a discussion of those components is provided herein. A first end face 152 and a second end face 154 of first thrust ring 150 are substantially parallel and extend from a cylindrical outer surface 156 of first thrust ring 150 to its cylindrical inner surface 158. Cylindrical inner surface 158 of first thrust ring 150 defines a bore having a greater diameter than that of axle shaft 120, and the outer diameter of cylindrical outer surface 156 of first thrust ring 150 is less than the inner diameter of the axle tube's first cylindrical recess 134 so that first thrust ring 150 is free to rotate about axle shaft 120.

Similarly, a first end face 192 and a second end face 194 of second thrust ring 190 are substantially parallel and extend from a cylindrical outer surface 196 of second thrust ring 190 to its cylindrical inner surface 198. Cylindrical inner surface 198 of second thrust ring 190 defines a bore having a greater diameter than that of axle shaft 120, and the outer diameter of cylindrical outer surface 196 of second thrust ring 190 is less than the inner diameter of the axle tube's first cylindrical recess 134 so that second thrust ring 190 is free to rotate thereabout. Additionally, second end face 196 defines an annular counterbore 199 formed therein.

Preferably, first and second thrust rings 150 and 190 are hardened or ground steel washers, although other materials are possible. As best seen in FIG. 8, first thrust ring 150 is disposed between first snap ring 124 and second thrust ring 190 such that its first end face 152 abuts first snap ring 124. Second thrust ring 190 is disposed between first thrust ring 150 and radial bearing assembly 110 such that its second end face 194 bears against first annular flange 116 of the bearing's outer cup 112.

During vehicle operations, axial thrust forces that are directed outwardly along axle shaft 120 are transferred to first thrust washer 150 by the abutment of first snap ring 124 on the first thrust washer's first end face 152. The axial thrust force is then transferred from first thrust washer 150 to second thrust washer 190 by way of their end faces being adjacent each other. Axial thrust forces are then transferred to outer cup 112 of radial bearing assembly 110 by way of the abutment of second end face 154 of second thrust washer 190 with first annular flange of the cup. Note, when the outward axial thrust force is low enough, the press-fit between outer cup 112 and axle tube 130 may be great enough to prevent outward motion of axle shaft 120. However, when the thrust force is great enough, outer cup 112 transfers the axial thrust force to second snap ring 144. Second snap ring 144 ultimately transfers the axial thrust force to axle tube 130 by way of being seated in annular groove 142 thereof. As previously noted, in an alternate embodiment of the axial thrust assembly 100c, snap ring 144 is not required as the press-fits between outer cup 112 and axle tube 130 exceeds maximum expected outward axial thrust forces on axle shaft 120. Additionally, in an alternate embodiment, first and second thrust washers 150 and 190 may be omitted so that first snap ring 124 bears directly on outer cup 112 of radial bearing assembly 110.

When axial thrust force caused by vehicle operations is directed inwardly, the axial thrust force transferred to snap ring holder 160 by first snap ring 124 may, in turn, be transferred from snap ring holder 160 to axle tube 130 by way of its abutment with first annular ledge 138. However, inward axial thrust forces acting on axle shaft 120 are preferably handled by abutment of the axle shaft's innermost end with a cross shaft 20 (FIGS. 3 and 4) of the axle's differential, in the manner previously discussed.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

What is claimed:

1. An axle assembly of a vehicle, comprising:
   a differential assembly;
   a first axle tube extending outwardly from a first side of the differential assembly, the first axle tube including a proximal end adjacent the differential assembly, an opposite distal end, an axle bore extending therebetween, and an annular groove in the axle bore of the axle tube;

a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface;

an annular ring holder axially fixed within the axle bore of the first axle tube;

a radial bearing assembly including an outer race that is axially fixed with regard to the axle tube and a plurality of roller elements rotatably received therein, the radial bearing assembly being disposed within the axle bore of the first axle tube;

a first snap ring received in the annular groove of the first axle shaft;

a second snap ring received in the annular groove of the axle tube, wherein the annular groove is between the distal end of the axle tube and the radial bearing assembly and the second snap ring is adjacent the outer race of the radial bearing assembly; and a thrust ring, the thrust ring being disposed within the axle bore of the first axle tube between the radial bearing assembly and the first snap ring so that the thrust ring abuts the radial bearing assembly.

2. The axle assembly of claim 1, wherein the thrust ring abuts the outer race of the radial bearing assembly.

3. The axle assembly of claim 1, wherein the thrust ring abuts the plurality of roller elements of the radial bearing assembly.

4. The axle assembly of claim 1, wherein the annular ring holder further comprises a counterbore formed in an end face thereof, and the first snap ring is disposed in the counterbore.

5. An axle assembly of a vehicle, comprising:
a differential assembly;
a first axle tube extending outwardly from a first side of the differential assembly, the first axle tube including a proximal end adjacent the differential assembly, an opposite distal end, an axle bore extending therebetween;
a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface;
a radial bearing assembly including an outer race and a plurality of roller elements rotatably received therein, the radial bearing assembly being disposed within the axle bore of the first axle tube;
a first snap ring received in the annular groove of the first axle shaft; and
a thrust ring that is being axially disposed between the radial bearing assembly and the first snap ring in the axle bore of the first axle tube so that the thrust ring bears against the radial bearing assembly,
wherein the first snap ring transmits axially directed force from the first axle shaft to the radial bearing assembly.

6. The axle assembly of claim 5, wherein the outer race of the radial bearing assembly is axially fixed with regard to the axle tube.

7. The axle assembly of claim 5, further comprising:
an annular groove in the axle bore of the axle tube between its distal end and the radial bearing assembly, and
a second snap ring received in the annular groove of the axle tube.

8. The axle assembly of claim 7, wherein the second snap ring is adjacent the outer race of the radial bearing assembly.

9. The axle assembly of claim 5, wherein the first snap ring abuts the outer race of the radial bearing assembly.

10. The axle assembly of claim 5, wherein the first snap ring abuts the plurality of roller elements of the radial bearing assembly.

11. The axle assembly of claim 5, further comprising an annular ring holder defining a counterbore in a first end face thereof, wherein the first snap ring is disposed in the counterbore.

12. The axle assembly of claim 5, wherein the thrust ring abuts the outer race of the radial bearing assembly.

13. The axle assembly of claim 5, wherein the thrust ring abuts the plurality of roller elements of the radial bearing assembly.

14. An axle assembly of a vehicle, comprising:
a differential assembly;
a first axle tube extending outwardly from a first side of the differential assembly, the first axle tube including a proximal end adjacent the differential assembly, an opposite distal end, an axle bore extending therebetween, and an annular groove in the axle bore of the axle tube;
a first axle shaft rotatably received in the first axle tube, the first axle shaft including a proximal end disposed in the differential assembly, an opposite distal end extending outwardly from the distal end of the first axle shaft, and an annular groove extending radially inwardly from its outer surface;
a radial bearing assembly including an outer race that axially fixed with regard to the axle tube and a plurality of roller elements rotatably received therein, the radial bearing assembly being disposed within the axle bore of the first axle tube;
a first snap ring received in the annular groove of the first axle shaft; and
a second snap ring received in the annular groove of the axle tube, wherein the annular groove is between the distal end of the axle tube and the radial bearing assembly,
wherein the first snap ring transmits axially directed force from the first axle shaft to the radial bearing assembly.

15. The axle assembly of claim 14, wherein the second snap ring is adjacent the outer race of the radial bearing assembly.

16. The axle assembly of claim 14, wherein the first snap ring abuts the outer race of the radial bearing assembly.

17. The axle assembly of claim 14, wherein the first snap ring abuts the plurality of roller elements of the radial bearing assembly.

18. The axle assembly of claim 14, further comprising an annular ring holder defining a counterbore in a first end face thereof, wherein the first snap ring is disposed in the counterbore.

19. The axle assembly of claim 14, further comprising a thrust ring, the thrust ring being axially disposed between the radial bearing assembly and the first snap ring in the axle bore of the first axle tube so that the thrust ring bears against the radial bearing assembly.

20. The axle assembly of claim 14, wherein the thrust ring abuts the outer race of the radial bearing assembly.

21. The axle assembly of claim 14, wherein the thrust ring abuts the plurality of roller elements of the radial bearing assembly.

* * * * *